United States Patent [19]
Sato

[11] Patent Number: 6,134,219
[45] Date of Patent: Oct. 17, 2000

[54] TEST OF CELL CONDUCTIVITY IN ATM SWITCHING SYSTEM

[75] Inventor: Kenichi Sato, Tokyo, Japan

[73] Assignee: NEC Corporation, Tokyo, Japan

[21] Appl. No.: 08/883,452

[22] Filed: Jun. 26, 1997

[30] Foreign Application Priority Data

Jun. 28, 1996 [JP] Japan ................................. 8-188287

[51] Int. Cl.⁷ .......................... G01R 31/08; G06F 11/00; G08C 15/00; H04J 1/16
[52] U.S. Cl. .......................... 370/244; 370/395; 370/412
[58] Field of Search .................................. 370/229, 230, 370/231, 235, 236, 241, 242, 244, 248, 249, 252, 412, 413, 428, 429, 389, 395; 395/877

[56] References Cited

U.S. PATENT DOCUMENTS

| 5,373,504 | 12/1994 | Tanaka et al. | 370/253 |
| 5,457,687 | 10/1995 | Newman | 370/232 |
| 5,513,191 | 4/1996 | Takechi et al. | 714/752 |
| 5,602,826 | 2/1997 | Yoshimura et al. | 370/248 |
| 5,668,801 | 9/1997 | Grunenfelder | 370/253 |
| 5,719,853 | 2/1998 | Ikeda | 370/229 |

FOREIGN PATENT DOCUMENTS 6268668  9/1994  Japan.

*Primary Examiner*—Douglas W. Olms
*Assistant Examiner*—Bob A. Phunkulh
*Attorney, Agent, or Firm*—Sughrue, Mion, Zinn, Macpeak & Seas, PLLC

[57] ABSTRACT

In an asynchronous transfer mode (ATM) switching system, a generating section generates test cells at a generation rate, and stops the generation of the test cells in response to a generation stopping instruction. Input and output buffer section stores normal cells and the test cells. Each of the normal cells is used for transferring speech or data Each of the input and output buffer sections issues a congestion notice in accordance with a storage state in the buffer section. An ATM switch receives the normal cells outputted from the input buffer section to transfer to an output port. A test section tests the test cells to determine whether cell conductivity is established. A control section issues the generation stopping instruction to the generating section in response to the congestion notice from the input or output buffer.

12 Claims, 3 Drawing Sheets

TEST OF CELL CONDUCTIVITY IN ATM SWITCHING SYSTEM

BACKGROUND OF THE INVENTION

1. Field of the Invention

The present invention relates to a test of cell conductivity, and more particularly to a test method of cell conductivity on a communication path in an ATM switching system and an apparatus for the same.

2. Description of the Related Art

A conventional cell conductivity test apparatus adaptive for an ATM switching system is proposed in, for example, Japanese Laid Open Patent Disclosure (JP-A-Heisei 6-268668). In the proposed cell conductivity test apparatus, a cell conductivity test circuit of a communication path is composed of a test cell generating unit for generating at a arbitrary rate test cells each of which has a cell header indicative of a destination address and a switching routing tag for sending out the test cell to a switch section, a test cell collecting section for collecting the test cells which are turned around by a line correspondence section in the communication path, and a test cell check section for testing the collected test cells. The cell conductivity test circuit is connected to the switch section in the communication path. A control unit performs the routing to the line correspondence section. In this manner, in the conventional cell conductivity test apparatus, the test cells can be sent out at an arbitrary rate, and a special test route of a specific portion can be tested individually.

The conventional cell conductivity test apparatus of an ATM switching system will be described below with reference to FIG. 1. As shown in FIG. 1, a test cell generating unit 1 generates test cells at an arbitrary rate. The generated test cells are supplied to an input buffer server 2. Normal cells which are used to transmit speech or data are also supplied to the input buffer server 2. The input buffer server 2 distinguishes the normal cells and the test cells to transfer to an the input buffer 3 and then to store therein. The cells read from the input buffer 3 are supplied to an output buffer 5 in a destination output port by an ATM switch 4 and stored therein. An output buffer server 6 reads the cells from the output buffer 5 and separates the read cells into the normal cells and the test cells. The normal cells are transferred to the next stage in a normal manner. The test cells are supplied to a test cell receiving unit 7. The test cell receiving unit 7 tests each of the test cells supplied from the output buffer server 6 to determine the normality of cell conductivity.

However, the above conventional cell conductivity test apparatus has only the test cell generating unit 1 for sending out the test cells to the ATM switch 4 at the arbitrary rate. Therefore, there is the following problem.

In the ATM switching system, the test cells used to determine the normality of cell conductivity are accumulated in the input buffer 3 and the output buffer 5 in the ATM switching system in the same manner as the normal cell and then is processed. For this reason, if the test cells are merely flowed from the test cell generating unit 1 at a high rate, there is possibility that the normal cells are discarded for these test cells when the network is in a congestion state. That is, there is a case where the quality of service to the normal cells can not be guaranteed because of the influence of the test cells flowed at the high rate.

On the other hand, when the test to determine the normality of cell conductivity is performed using the test cells flowed at a very low rate, there is possibility that the ATM switching system is determined to be in a normal state, even if the ATM switching system has an intermittent fault in the communication path. Therefore, the cell conductivity test needs to be performed at a higher rate.

SUMMARY OF THE INVENTION

The present invention is made in the light of the above circumstances. Therefore, an object of the present invention is to provide an ATM cell conductivity test method in which the cell conductivity test can be performed without influencing to the quality of service to normal cells, and an apparatus for the same.

Another object of the present invention is to provide an ATM cell conductivity test method in which the cell conductivity test can be performed using test cells sent out at an arbitrary rate from a low rate to a high rate, and an apparatus for the same.

In order to achieve an aspect of the present invention, an asynchronous transfer mode (ATM) switching system includes a generating section for generating test cells at a generation rate, and for stopping the generation of the test cells in response to a generation stopping instruction, an input buffer section for receiving normal cells and the test cells generated by the generating section to store therein, for outputting the stored normal cells and the stored test cells, and for issuing a first congestion notice in accordance with a storage state in the input buffer section, each of the normal cells being used for transferring speech or data, an ATM switch for receiving the normal cells outputted from the input buffer section to transfer to an output port, an output buffer section associated with the output port, for receiving the normal cells and the test cells to store therein, for selecting the test cells from among the cells stored therein, and for issuing a second congestion notice in accordance with a storage state in the output buffer section, a test section for testing the test cells selected by the output buffer section to determine whether cell conductivity is established, and a control section for issuing the generation stopping instruction to the generating section in response to the first congestion notice from the input buffer section or the second congestion notice from the output buffer section.

When the control section further issues a test cell invalidating instruction in response to the first or second congestion notice, the test section stops the test in response to the test cell invalidating instruction. Also, when the control section further issues a test cell removing instruction in response to the first or second congestion notice, each of the input and output buffer sections remove the test cells stored therein in response to the a test cell removing instruction. In this case, each of the input and output buffer sections may release resources used by the test cells removed in response to the test cell removing instruction.

The generation rate of the test cells generated by the test cell generating section and a class of the generated test cells may be designated previously. When the control section further includes a section for setting threshold values to the input and output buffer sections, respectively, each of the input and output buffer sections determines whether the number of cells stored therein exceeds the threshold value, and issues the congestion notice to the control section when it is determined that the number of cells stored therein exceeds the threshold value.

In order to achieve another aspect of the present invention, a method for testing conductivity of a cell in asynchronous transfer mode (ATM) switching system, includes the steps of:

generating test cells at a generation rate;

storing the generated test cells and normal cells, each of the normal cells being used for transmitting speech or data;

transferring the stored test cells through a switching section to a test unit for testing the test cells to determine whether cell conductivity is established;

generating a congestion notice when a number of stored cells exceeds a predetermined threshold value;

inhibiting the generation of the test cells in response to the congestion notice;

stopping the test of the test cells in response to the congestion notice; and discarding the stored test cells in response to the congestion notice to release resources used by the test cells.

In the storing step, when the normal cells and the test cells are received, the received normal cells and the received test cells are stored in different memory areas selected from an unused area, respectively, and the memory area used by the test cells is managed. In this case, by linking the memory area used by the test cells with the unused area in response to the congestion notice, the test cells are discarded.

In order to achieve still another aspect of the present invention, an input/output buffer type asynchronous transfer mode (ATM) switching system includes a generating section for generating test cells at a generation rate, a buffer section for storing the test cells and normal cells, each of the normal cells being used for transferring speech or data, an ATM switch section for transferring the test cells and the normal cells via the buffer section, a test section for testing the test cells transferred by the ATM switch section to determine whether cell conductivity is established, a generation stopping section for inhibiting the generation of the test cells in accordance with the storage state of the test cells and the normal cells in the buffer section, and a test stopping section for stopping the test by the test section in accordance with the storage state of the test cells and the normal cells in the buffer section.

DESCRIPTION OF THE PREFERRED EMBODIMENTS

A cell conductivity test apparatus of the present invention will be described below in detail with reference to the accompanying drawings.

Figure 1:
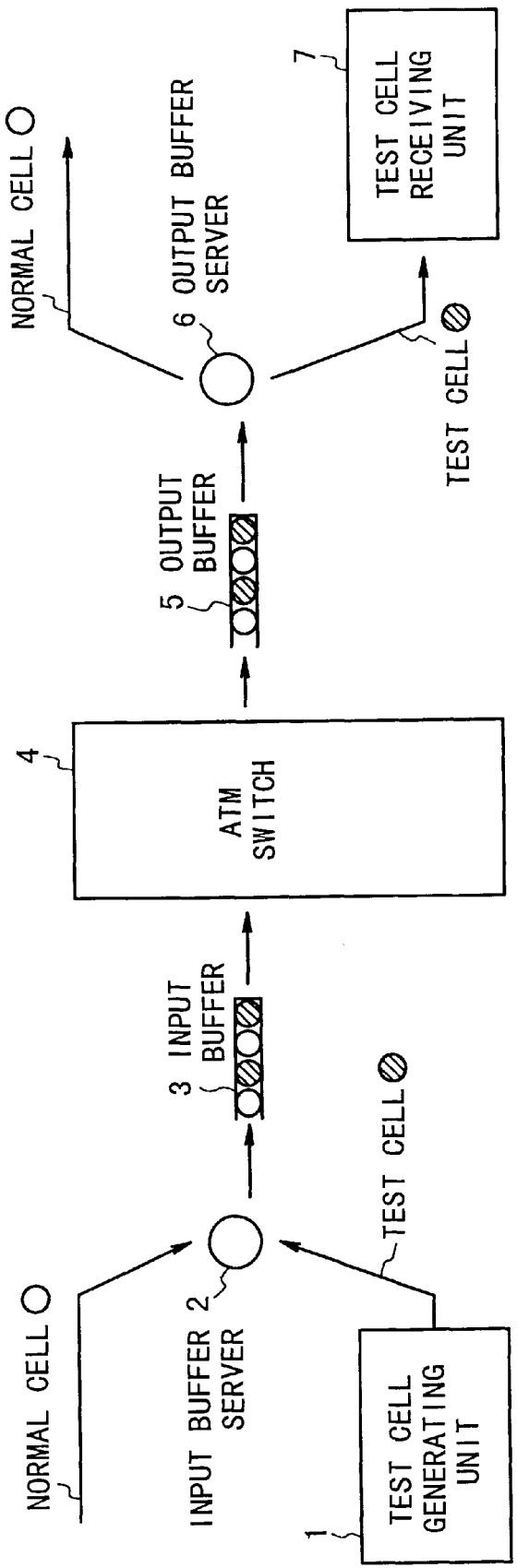
FIG. 1 is a schematic block diagram illustrating a conventional cell conductivity test apparatus.
Figure 2:
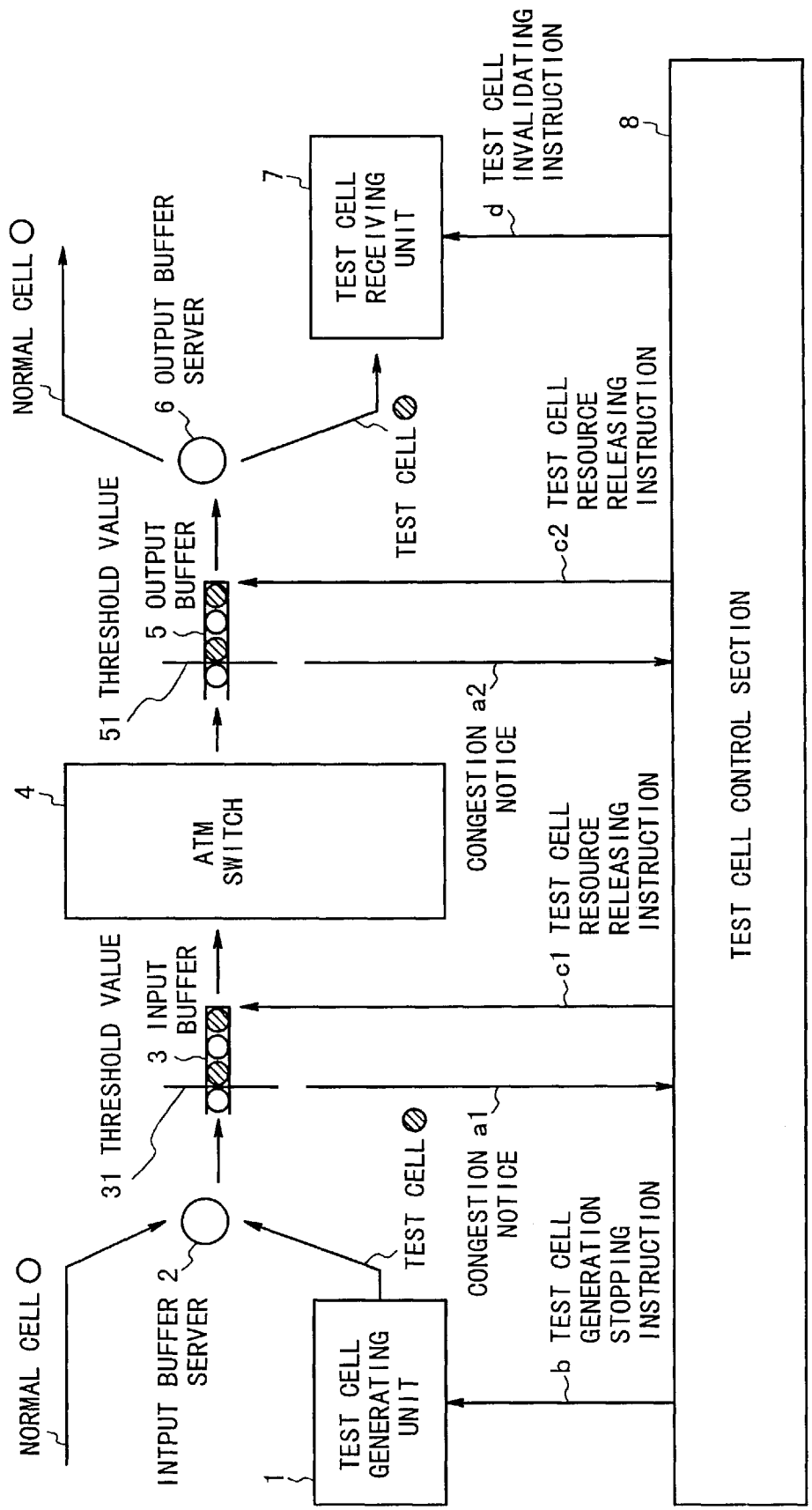
FIG. 2 is a schematic diagram illustrating a cell conductivity test apparatus according to an embodiment of the present invention.

FIG. 2 is a schematic block diagram illustrating the structure of the cell conductivity test apparatus according to the embodiment of the present invention. Referring to FIG. 2, in this embodiment, the cell conductivity test apparatus in an ATM switching system is composed of a test cell generating unit 1, an input buffer server 2, an input buffer 3, an ATM switch section 4, an output buffer 5, an output buffer server 6, a test cell receiving unit 7, and a test cell control section 8.

The test cell generating unit 1 has a function to generate test cells of an arbitrary traffic class at an arbitrary rate under the control of a test cell control section 8. That is, the generation rate of the test cells can be designated by the test cell control section 8. Also, the class of the generated test cell can be designated by the test cell control section 8. The generated test cells can be sent out through the input buffer server 2 to the input buffer 3 provided at the front-stage of the ATM switch section 4.

The input buffer server 2 has a function to receive and distinguish normal cells and the test cells and to transfer them to the input buffer 3.

The input buffer 3 has a function to accumulate the cells before switching is performed. Also, the input buffer 3 has a function to issue a congestion notice to the test cell control section 8 when the quantity of accumulated cells exceeds a predetermined threshold value and a function to release resources occupied by the accumulated test cells in response to a test cell resource release instruction from the test cell control section 8.

The ATM switch section 4 has a plurality of input ports and a plurality of output ports. The above input buffer 3 is associated with one of the plurality of input ports. The output buffer 5 is associated with one of the plurality of output ports. The ATM switch section 4 can transfer a cell supplied from the input buffer 3 to the output buffer 5 associated with a destination one of the output ports by the cell at a high speed.

The output buffer 5 has a function to accumulate the cells outputted from the ATM switch section 4. Also, the output buffer 5 has a function to issue a congestion notice to the test cell control section 8 when the quantity of accumulated cells exceeds a predetermined threshold value. The output buffer 5 has a function to release resources occupied by the accumulated test cells in response to the test cell resource releasing instruction from the test cell control section 8.

The output buffer server 6 is provided for the rear-stage of the output buffer 5. The output buffer server 6 has a function to read the accumulated cells for separating the read cells into the normal cells and the test cells to the test cell receiving unit 7.

The test cell receiving unit 7 tests the test cells delivered from the output buffer server 6 to determine the normality of cell conductivity. The test cell receiving unit 7 stops the test in response to a test cell invalidating instruction from the test cell control section 8.

The test cell control section 8 receives the congestion notice from the input buffer 3 or the output buffer 5, and issues the test cell generation stopping instruction to the test cell generating unit 1, the test cell resource releasing instruction to the input buffer 3 or the output buffer 5 which has outputted the congestion notice, the test cell invalidating instruction to the test cell receiving unit 7.

Next, the operation of the embodiment of the present invention will be described below with reference to FIG. 2. First, the basic operation will be described.

The test cell generating unit 1 generates test cells. The generation rate and the traffic class of the test cells are previously set by the test cell control section 8. Each of the generated test cells has an identifier indicating that the cell is a test cell. The generated test cells are supplied to the input buffer server 2. The input buffer server 2 receives normal cells and the test cells generated by the generating unit 1 to accumulate in the input buffer 3. After that, the accumulated cells are sequentially sent out to the ATM switch section 4 in order, and switched by the ATM switch section 4 such that the cells are switched in accordance with the destination addresses. The cells outputted to the output buffer 5 at a destination one of the output ports to be accumulated therein.

The cells accumulated in the output buffer 5 are read out by the output buffer server 6. The output buffer server 6 determines whether the read out cell is the test cell or the normal cell, based on the test cell identifier. When the read out cell is the test cell, the output buffer server 6 transfers the read out cell to the test cell receiving unit 7. On the other hand, when the read out cell is the normal cell, the output buffer server 6 outputs the read out cell to the next stage for a normal operation.

The test cell receiving unit 7 receives the test cell from the output buffer server 6 and determines whether the normality of the conductivity is established.

Next, the operation in a congestion state will be described below.

The threshold values 31 and 51 for the test cells are set in the input buffer 3 and the output buffer 5 by the test cell control section 8, respectively. When a great amount of traffic is generated so that the test cells and the normal cells are accumulated in the input or output buffer 3 or 5 in the network and the number of cells accumulated in the input buffer 3 or the output buffer 5 exceeds the threshold value 31 or 51 for the test cells, the congestion notice a1 or a2 is issued to the test cell control section 8. In response to the congestion notice a1 or a2 from the input buffer 3 or the output buffer 5, the test cell control section 8 first issues the test cell invalidating notice d to the test cell receiving unit 7. The test cell receiving unit 7 stops the test of the test cells and enters a standby state.

Next, the test cell control section 8 issues a test cell generation stopping instruction b to the test cell generating unit 1. The test cell generating unit 1 stops the generation and sending-out of the test cells at once.

Next, the test cell control section 8 issues the test cell resource releasing instructions c1 and c2 to the input buffer 3 and the output buffer 5 which have issued the congestion notice, respectively. The input buffer 3 or the output buffer 5 releases the resources which are used by the test cells accumulated in each of the buffers such that the resources can be used only by the normal cells.

Next, the embodiment of the present invention will be more specifically described with reference to FIG. 3.

Figure 3:
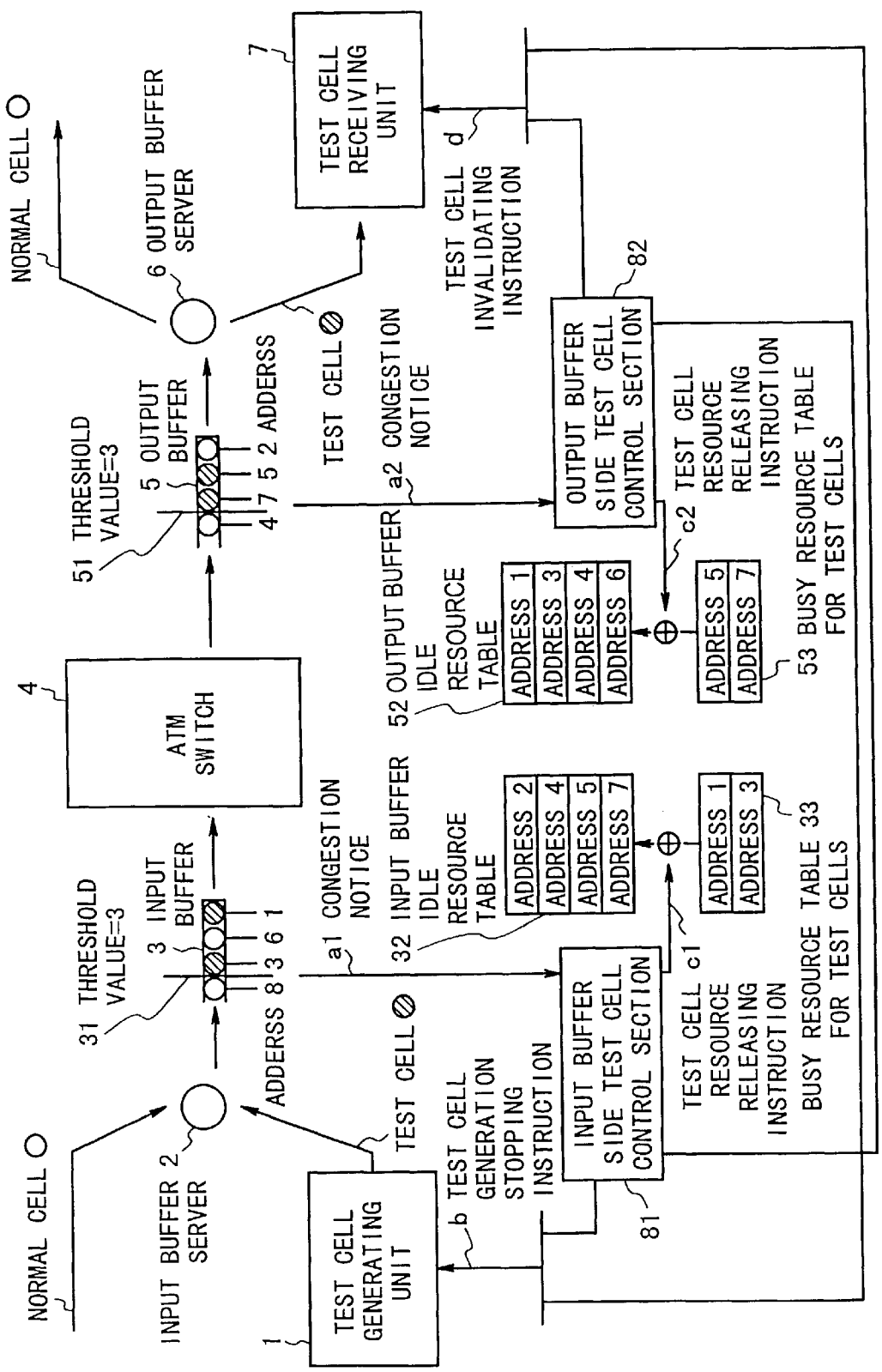
FIG. 3 is a diagram illustrating the operation of the cell conductivity test and the structure of a cell conductivity test apparatus used in the embodiment of the present invention.

Referring to FIG. 3, the test cell control section has the structure in which the test cell control section is composed of an input buffer side test cell control section 81 which belongs to the input buffer 3 and an output buffer side test cell control section 82 which belongs to the output buffer 5.

The input buffer side test cell section 81 has a function ① to receive the congestion notice from the input buffer 3, a function ② to make the test cell generating unit 1 to stop the generation of test cells, a function ③ to the input buffer 3 and the output buffer 5 to release resources used by the test cells, and a function ④ to the test cell receiving unit 7 to stop the test of the test cells.

A high-speed random access memory is desirably used as the input buffer 3 to form a queue having a random-in and random-out structure. The queue can be divided into a portion where cells are actually accumulated and a portion which no cell is accumulated. In FIG. 3, the former is shown by the cells accumulated in the input buffer 3 and the latter is shown as an input buffer idle resource table 32. The input buffer idle resource table 32 is the address table for managing an unused buffer area, and desirably formed of a random access memory. Another table is provided to manage a head address of each of the test cells accumulated in the input buffer 3 and this table is shown as a busy resource table 33 for the test cells.

The output buffer side test cell section 82 has the same structure as the input buffer side test cell section 81. That is, the output buffer side test cell section 82 has a function ① to receive the congestion notice from the output buffer 5, a function ② to the test cell generating unit 1 to stop the generation of test cells, a function ③ to the input buffer 3 and the output buffer 5 to release resources used by the test cells, and a function ④ to the test cell receiving unit 7 to stop the test of the test cells.

A high-speed random access memory is desirably used as the output buffer 5 to form a queue having a random-in and random-out structure. The queue can be divided into a portion where cells are actually accumulated and a portion which no cell is accumulated.

In FIG. 3, the former is shown by the cells accumulated to the output buffer 5 and the latter is shown as an output buffer idle resource table 52. The output buffer idle resource table 52 is the address table for managing an unused buffer area, and desirably formed of a random access memory. Another table is provided to manage a head address of each of the test cells accumulated in the output buffer 5 and this table is shown as a busy resource table 53 by the test cells.

The test cell generating unit 1 has a function to generate test cells of an arbitrary traffic class at an arbitrary rate. The test cell generating unit 1 sends out the generated test cells to the input buffer 3 which is provided in the front-stage of the ATM switch section 4, through the input buffer server 2. The input buffer server 2 sequentially distinguishes normal cells and the test cells to transfer the cells to the input buffer 3. At this time, the input buffer 3 refers to the input buffer idle resource table 32 to allocate one of the addresses to the distinguished cell. Also, the input buffer 3 updates the busy resource table 33 for the test cells in accordance with the allocation. The input buffer 3 accumulates the transferred cells before the switching is performed. When the number of accumulated cells exceeds a predetermined threshold value, the input buffer 3 issues a congestion notice. Also, the input buffer 3 releases the resources used by the accumulated test cells in response to the test cell resource releasing instruction by referring to the busy resource table 33. The ATM switch section 4 has a plurality of input ports and a plurality of output ports, and transfers a cell supplied from the input buffer 3 associated with one of the input ports to the output buffer 5 associated with one of the output ports at a high speed.

The output buffer 5 is provided for every output port of the ATM switch section 4. The output buffer 5 has a function to accumulate the cells outputted from the ATM switch section 4 by referring to an output buffer idle resource table 52 such that one of the memory areas is allocated to each of the transferred cells. The output buffer 5 also has a function to issue a congestion notice when the accumulation quantity exceeds a predetermined threshold value and to release the resources used by the accumulated test cells in response to the test cell resource releasing instruction by referring to the busy resource table 53. The output buffer server 6 is provided in the rear-stage of the output buffer 5 and reads the accumulated cells to separate into the normal cells and the test cells. The test cell receiving unit 7 tests each of the test cells delivered from the output buffer server 6 to determine whether the normality of conductivity is established.

The operation of the embodiment of the present invention will be described below with reference to FIG. 3. As described above, the test cell generating unit 1 generates the test cells. The generation rate of these test cells is previously set by the input buffer side test cell control section 8. The generated test cells have the identifiers indicating that they are the test cells, and are supplied to the input buffer server 2. The input buffer server 2 receives the normal cells and the test cells to accumulate in the input buffer 3.

The accumulating operation and read operation of these cells will be described below.

A random access memory is used as the input buffer 3. The input buffer 3 is divided into some memory blocks which can accumulate the cells. The head address of the accumulated cells is managed by the table which is developed on the random access memory. In this embodiment, the input buffer 3 is divided into eight blocks on the explanation.

In the state shown in FIG. 3, the blocks of the input buffer 3 shown by the addresses 1, 3, 6 and 8 are currently used. Among these blocks, the test cells are accumulated in the blocks shown by the addresses 1 and 3, and the test cells are shown by slanted lines inside the circle. Also, the normal cells are accumulated in the blocks shown by addresses 6 and 8 and the normal cells are shown by the white circles. The memory areas used by the cells is referred to as "busy resources". Especially, the memory areas where the test cells are accumulated are managed by the busy resource table 33.

In this embodiment, the memory areas shown by the addresses 2, 4, 5 and 7 are in the idle state and managed using the input buffer idle resource table 32. When the cell is accumulated, the input buffer idle resource table 32 is referred to to find an empty memory area and the cell is stored in the empty memory area. Then, when the cell is the test cell, the busy resource table 33 is updated.

When each of the cells accumulated in the input buffer 3 is read out, the head address for the read out cell is returned back to the input buffer idle resource table 32, so that the memory are used by the read out cell is set to an idle state. Thus, when the read out cell is the test cell, the busy resource table 33 is updated. Then, the read out cell is sent out to the ATM switch section 4. Thus, the cells accumulated in the input buffer 3 are all to the ATM switch section 4.

The cell inputted to the ATM switch section 4 is switched to a desired output port and is accumulated in the output buffer 5. The accumulating operation in the output buffer 5 and the read operation from the output buffer 5 are the same as those in the input buffer 3.

In the state shown in FIG. 3, the cells are accumulated in the memory block shown at the addresses 2, 4, 5 and 7. Especially, the test cells are accumulated in the memory blocks shown by the addresses 5 and 7 and the normal cells are accumulated in the memory blocks designated by the addresses 2 and 4. Also, memory areas in the idle state are managed by the output buffer idle resource table 52. That is, the memory blocks designated by the addresses 1, 3, 4 and 6 are in the idle state. Also, the head addresses 5 and 7 of the memory areas where the test cells are accumulated such that the memory areas are in the busy state are managed by the busy resource table 53.

The output buffer server 6 sequentially reads the cells from the output buffer 5 to send the test cells with the identifiers to the test cell receiving unit 5 and to the cells other than the test cells to the following stage as the normal cells. The test cell receiving unit 7 receives the test cells and tests the test cells to determine whether the normality of the conductivity is established.

Next, the operation in the congestion state is described for the above embodiment. The threshold values 31 and 51 for the test cells are previously set to the input buffer 3 and the output buffer 5, respectively. When a great traffic amount is generated and the test cells and the normal cells are accumulated in the buffers of the network, and so that the number of accumulated cells exceeds one of the threshold values 31 and 51 of the input buffer 3 and the output buffer 5 for the test cells, the congestion notice a1 or a2 is issued to the test cell control section 8.

It is assumed in this example that a great amount of cells are accumulated in the output buffer 5 such that the number of cells exceeds the threshold value 51. In the example, the threshold value 51 is set to "3" and the fourth cell is being accumulated in the output buffer 5.

When the number of accumulated cells exceeds the threshold value of "3", the output buffer 5 outputs the congestion notice a2 to the output buffer side test cell control section 82.

In response to the congestion notice a2, the output buffer side test cell control section 82 first issues the test cell invalidating notice d to the test cell receiving unit 7. As a result, the test cell receiving unit 7 stops the test of the test cells and enters the standby state. Also, the output buffer side test cell control section 82 issues the test cell generation stopping instruction b to the test cell generating unit 1. In response to the stopping instruction b, the test cell generating unit 1 stops the generation and sending-out of the test cells at once. Next, the output buffer test cell control section 82 links the busy resource table 53 to the output buffer idle resource table 53 such that the memory areas used by the test cells are released at the moment.

That is, in this embodiment, because the test cells accumulated in the memory area which are designated by the addresses 5 and 7 are discarded, the state is set in which only the two normal cells 2 and 4 are accumulated in the output buffer 5. In this manner, the influence of the test cells to the output buffer 5 in the congestion state can be prevented.

Thereafter, when the congestion notice is canceled, the output buffer side test cell control section 82 cancels the test cell generation stopping instruction b. As a result, the test cell generating unit 1 restarts the generation and sending-out of test cells. Also, the test cell invalidating instruction d is canceled so that the test cell receiving unit 7 restarts the test of the test cells.

Note that there is a case where the input buffer and the output buffer are divided into a plurality of buffer portions for the various traffic classes such as a constant bit rate (CBR), a variable bit rate (VBR) and an available bit rate (ABR). However, when the method proposed in the present invention is applied to each of these buffer portions, the cell conductivity test can be performed to all the routes.

As described above, according to the present invention, the processing that the test cells are discarded in the congestion state prior to the normal cells is performed. Therefore, a band for the normal cells can be guaranteed. Also, because the test cells can be flowed at a high rate in the normal state, the cell conductivity can be tested with strictness and high reliability.

Also, when the present invention is applied to each of a plurality of buffers, the conductivity test can be performed to all the routes.

What is claimed is:

1. An asynchronous transfer mode (ATM) switching system comprising:

a generating section generating test cells at a generation rate, and stopping the generation of the test cells in response to a generation stopping instruction;

an input buffer section receiving and storing normal cells and the test cells, outputting the stored normal cells and the stored test cells, and issuing a first congestion notice of accordance with a storage state of said input buffer section;

an ATM switch outputting, to an output port, the normal cells outputted from said input buffer section;

an output buffer section receiving and storing the normal cells and the test cells, selecting the test cells from among the stored cells, and issuing a second congestion notice in accordance with a storage state of said output buffer section;

a test section testing the test cells selected by said output buffer section to determine cell conductivity; and a control section issuing the generation stopping instruction in response to receiving one or more of said first congestion notice and said second congestion notice.

2. An ATM switching system according to claim 1, wherein:

said control section issues a test cell invalidating instruction in response to said one or more of said first and second congestion notices, and said test section stops the test in response to said test cell invalidating instruction.

3. An ATM switching system according to claim 1, wherein:

said control section issues a test cell removing instruction in response to said one or more of said first and second congestion notices, and each of said input and output buffer sections remove the stored test cells in response to said test cell removing instruction.

4. An ATM switching system according to claim 3, wherein each of said input and output buffer sections releases resources used by the test cells removed in response to said test cell removing instruction.

5. An ATM switching system according to claim 1, wherein said control section further includes a section for designating the generation rate of the test cells.

6. An ATM switching system according to claim 1, wherein said control section further includes a section for designating a class of the generated test cells.

7. An ATM switching system according to claim 1, wherein:

the first congestion notice is issued when the number of cells stored in the input buffer section exceeds a first threshold value, and the second congestion notice is issued when the number of cells stored in the output buffer section exceeds a second threshold value.

8. An asynchronous transfer mode (ATM) switching system comprising:

a generating section for generating test cells at a generation rate, and for stopping the generation of the test cells in response to a generation stopping instruction;

an input buffer section for receiving normal cells and the test cells generated by said generating section to store therein, for outputting the stored normal cells and the stored test cells, and for issuing a first congestion notice of accordance with a storage state in said input buffer section, each of the normal cells being used for transferring speech or data;

an ATM switch for receiving the normal cells outputted from said input buffer section to transfer to an output port;

an output buffer section associated with the output port, for receiving the normal cells and the test cells to store therein, for selecting the test cells from among the cells stored therein, and for issuing a second congestion notice in accordance with a storage state in said output buffer section;

a test section for testing the test cells selected by said output buffer section to determine whether cell conductivity is established; and a control section for issuing the generation stopping instruction to said generating section is in response to said first congestion notice from said input buffer section or said second congestion notice from said output buffer section;

wherein said control section further issues a test cell removing instruction in response to said first or second congestion notice;

wherein each of said input and output buffer sections remove the test cells stored therein in response to said test cell removing instruction; and wherein each of said input and output buffer sections releases resources used by the test cells removed in response to said test cell removing instruction.

9. A method for testing conductivity of a cell in asynchronous transfer mode (ATM) switching system, comprising the steps of:

generating test cells at a generation rate;

storing the generated test cells and normal cells, each of the normal cells being used for transmitting speech or data;

transferring the stored test cells to a test unit for testing the test cells to determine whether cell conductivity is established;

generating a congestion notice when a number of stored cells exceeds a predetermined threshold value;

inhibiting the generation of the test cells in response to the congestion notice;

stopping the test of the test cells in response to the congestion notice; and discarding the stored test cells in response to the congestion notice to release resources used by the test cells;

wherein said storing step includes:

receiving the normal cells and the test cells;

storing the received normal cells and the received test cells in different memory areas selected from an unused area, respectively; and managing the memory area used by the test cells.

10. A method according to claim 9, wherein said discarding step includes linking the memory area used by the test cells with the unused area.

11. A method for testing conductivity of a cell in asynchronous transfer mode (ATM) switching system, comprising the steps of:

generating test cells at a generation rate;

storing the generated test cells and normal cells, each of the normal cells comprising data bits;

transferring the stored test cells to a test unit and testing the test cells to determine whether cell conductivity is established;

generating a congestion notice when a number of stored cells exceeds a predetermined threshold value;

inhibiting the generation of the test cells in response to the congestion notice;

stopping the testing of the test cells in response to the congestion notice; and releasing resources used by the test cells and discarding the stored test cells in response to the congestion notice;

wherein said storing step includes:

receiving the normal cells and the test cells;

storing the received normal cells and the received test cells in different memory areas selected from an unused area, respectively; and managing the memory area used by the test cells.

12. A method according to claim 11, wherein said discarding step includes linking the memory area used by the test cells with the unused area.

* * * * *